US011661545B2

(12) United States Patent
Zakaria

(10) Patent No.: US 11,661,545 B2
(45) Date of Patent: May 30, 2023

(54) USE OF CONTROLLED RELEASE ACID SYSTEM IN TREATMENT OF WELLS

(71) Applicant: Baker Hughes Oilfield Operations LLC, Houston, TX (US)

(72) Inventor: Ahmed S Zakaria, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/342,095

(22) Filed: Jun. 8, 2021

(65) Prior Publication Data

US 2022/0389305 A1 Dec. 8, 2022

(51) Int. Cl.

| C09K 8/74 | (2006.01) |
|---|---|
| C09K 8/504 | (2006.01) |
| C09K 8/508 | (2006.01) |
| C09K 8/516 | (2006.01) |
| C09K 8/52 | (2006.01) |
| C09K 8/70 | (2006.01) |

(52) U.S. Cl.
CPC ............... *C09K 8/74* (2013.01); *C09K 8/508* (2013.01); *C09K 8/5045* (2013.01); *C09K 8/516* (2013.01); *C09K 8/52* (2013.01); *C09K 8/706* (2013.01)

(58) Field of Classification Search
None
See application file for complete search history.

(56) References Cited

U.S. PATENT DOCUMENTS

| 3,409,079 A | 11/1968 | Burtch |
| 4,074,760 A | 2/1978 | Copeland et al. |
| 4,081,030 A | 3/1978 | Carpenter et al. |
| 4,203,492 A * | 5/1980 | Watanabe ................ C09K 8/72 |
| | | 166/308.2 |
| 5,178,218 A | 1/1993 | Dees |
| 7,059,414 B2 | 6/2006 | Rae et al. |
| 7,086,469 B2 | 8/2006 | Metcalf et al. |
| 7,303,018 B2 | 12/2007 | Cawiezel et al. |
| 7,781,381 B2 | 8/2010 | Ke et al. |
| 7,994,102 B2 | 8/2011 | Gupta et al. |
| 8,136,595 B2 | 3/2012 | Weaver et al. |
| 8,196,662 B2 | 6/2012 | Plasier et al. |
| 8,789,596 B2 | 7/2014 | Curtis et al. |
| 9,976,073 B2 | 5/2018 | Salla et al. |
| 10,287,865 B2 | 5/2019 | Brannon et al. |
| 10,895,140 B2 | 1/2021 | Cairus et al. |
| 2006/0131022 A1 | 6/2006 | Rae et al. |
| 2008/0182761 A1 | 7/2008 | Stephenson et al. |
| 2012/0024530 A1 | 2/2012 | Todd et al. |
| 2017/0073571 A1 | 3/2017 | Salla et al. |
| 2017/0218261 A1 * | 8/2017 | Nguyen ............... E21B 33/138 |
| 2017/0335174 A1 * | 11/2017 | Blattel ................... C09K 8/72 |
| 2020/0317995 A1 | 8/2020 | Beuterbaugh et al. |
| 2020/0362232 A1 * | 11/2020 | Al-Nakhli ............... E21B 43/27 |
| 2020/0399530 A1 | 12/2020 | Zakaria et al. |
| 2021/0062073 A1 | 3/2021 | Gomaa et al. |

OTHER PUBLICATIONS (Partial) International Search Report and Written Opinion, International Application No. PCT/US2022/029146, dated Aug. 29, 2022.

* cited by examiner

*Primary Examiner* — Andrew Sue-Ako
(74) *Attorney, Agent, or Firm* — John Wilson Jones; Jones Delflache LLP

(57) ABSTRACT

Release of hydrochloric acid, hydrofluoric acid and fluoroboric acid into a well may be controlled by introducing into the well an aqueous fluid containing ammonium chloride, ammonium bifluoride, ammonium fluoroborate, ammonium tetrafluoroborate or a mixture thereof and a breaker. After being introduced into the well, the ammonium salt reacts with the breaker and the acid is released into the well.

23 Claims, No Drawings

USE OF CONTROLLED RELEASE ACID SYSTEM IN TREATMENT OF WELLS

FIELD

The disclosure relates to use of an aqueous fluid for controlling acid release into a well or a subterranean formation penetrated by a well. The aqueous fluid comprises an acid generating ammonium salt and a breaker.

BACKGROUND

Aqueous acidic solutions are commonly introduced into wells to increase the permeability of subterranean formations penetrated by the well and thus enhance the productivity of hydrocarbons from the formations. In some instances, aqueous acidic solutions are used in the stimulation of the formation. In other instances, aqueous acidic solutions may be used to remove formation damage during well completions or subsequent workovers.

Acidizing a formation is the process of reacting an acid with the formation to enhance the flow of hydrocarbons to the wellbore. In the process, dissolution of existing formation materials may occur. Further, blockages, often caused by natural or man-made conditions such as drilling mud invasion or clay migration, are removed or bypassed. Acidizing or acid stimulation increases the size of the pores within the formation and creates opened channels or passageways for hydrocarbons, water, or steam. This improves the formation productivity and thereby the production rate of the hydrocarbons from the formation.

Common methods of acidizing a formation are acid fracturing and matrix stimulation. In acid fracturing, acidizing fluid is pumped into the well at a pressure sufficient to create or enhance fractures. Typically, corrosive low pH acids are used to dissolve or etch channels or grooves along the fracture face such that highly conductive channels exist after pressure is relieved and fractures heal. This allows unrestrained hydrocarbon flow from the reservoir to the wellbore.

Matrix acidizing is often used in sandstone formations to remove near wellbore damage. In matrix acidizing, often used to enhance near-wellbore permeability, the acidizing fluid is injected into the formation at pressures lower than those which induce fracturing. The acid dissolves the formation minerals, and any other contaminants introduced to the formation. Thereby, the permeability of the formation is increased. Formation damage caused by drilling mud invasion and clay migration may also be removed during the process.

In acid fracturing and matrix acidizing, the penetration depth of the acid into the created fracture is limited because the reaction of the acid with the formation is rapid upon entry and the acid spends near the wellbore area. For instance, in matrix acidizing, penetration depth is limited because the acid reaction with the formation is rapid upon entry and the acid spends near the wellbore area. The limited acid radial penetration, caused by the rapid spending of the acid upon introduction into the formation, presents a severe limitation in acidizing operations.

Further, many subterranean formations have sections with varying permeability. When acid is injected into the formation, it typically acidizes the section of the formation with the highest permeability. Most acidizing formulations lacked a control mechanism to divert or force the acid from the higher permeability of the formation to lower permeability sections.

While fracture acidizing is often a preferred method of treating carbonate formations, most sandstone surfaces are known not to be etched by acid in the same manner. A common method of treating sandstone formations involves introducing corrosive, very low pH acids (preferably those having a pH less than zero) or "mud acids" into the wellbore and allowing the acid to react with the surrounding formation. Mud acids (mixtures of hydrofluoric acid and hydrochloric acid) are the preferred acid systems for sandstone formations. The acid is required to maintain a low pH as the acid spends, retaining dissolved silicates (such as clays and feldspars) in solution. However, such acid tends to react very rapidly with authigenic clays, such as smectite, kaolinite, illite and chlorite, especially at temperatures above 150° F. Because of the rapid reaction, acid may penetrate only few inches into the formation before HF is spent. Means for retarding the spending of the acid is therefore desired.

In addition, a common problem associated with acid treatments is the severe corrosion of the acid fluids to pumping and wellbore tubing. The cost of repairing or replacing corrosion-damaged casing, tubing, and other equipment in the wellbore is extremely high. Problems of corrosion are exacerbated by elevated temperatures and pressures encountered in deeper formations.

Attempts at controlling acid fluids reactivity have included use of one or more viscosifying agents, such as a polymer, optionally with a crosslinking agent, to provide a fluid where the aqueous acid fluid is gelled containing a HCl solution. High friction pressures are often associated with pumping viscous gelled fluids into the well. These systems further often left residues in the formation, which further damaged the formation.

Therefore, there is a need to develop an acidizing system capable of being controlled. The control of the system should be capable of being delayed to provide no corrosion effect on wellbore tubulars and downhole equipment's and allow for live acid deep penetration in the formation It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY

In an embodiment, the disclosure is drawn to a method of treating a well or a subterranean formation penetrated by a well by pumping into the well an aqueous fluid comprising a breaker and a hydrochloric acid, hydrofluoric acid, or fluoroboric acid generating ammonium salt. The ammonium salt may be ammonium chloride, ammonium bifluoride, ammonium fluoroborate, ammonium tetrafluoroborate or a mixture thereof. Hydrochloric acid, hydrofluoric acid, or fluoroboric acid is released in the formation from the reaction between the ammonium salt and breaker.

In another embodiment, the disclosure relates to a method of acidizing a subterranean formation by first introducing into the subterranean formation an aqueous fluid comprising a breaker and a hydrochloric acid, hydrofluoric acid, or fluoroboric acid generating ammonium salt. The ammonium salt may be ammonium chloride, ammonium bifluoride, ammonium fluoroborate, ammonium tetrafluoroborate or a mixture thereof. Hydrochloric acid, hydrofluoric acid, or fluoroboric acid is released into the formation from the reaction between the ammonium salt and breaker. Acid soluble materials are dissolved in the subterranean formation in the released acid, thereby improving permeability of the subterranean formation.

In another embodiment, a method for dissolving acid-soluble siliceous material in a formation penetrated by a well is provided. In this embodiment, an aqueous fluid is introduced into the well, the aqueous fluid containing a breaker and a hydrochloric acid, hydrofluoric acid, or fluoroboric acid generating ammonium salt. The ammonium salt may be ammonium chloride, ammonium bifluoride, ammonium fluoroborate, ammonium tetrafluoroborate or a mixture thereof. Hydrochloric acid, hydrofluoric acid or fluoroboric acid is released in the formation from the reaction between the ammonium salt and breaker. Acid-soluble siliceous materials are dissolved in the released acid.

In another embodiment, a method for dissolving carbonate materials in a subterranean formation is provided. In this embodiment, an aqueous fluid is introduced into a well penetrating the formation. The aqueous fluid contains a breaker and a hydrochloric acid, hydrofluoric acid, or fluoroboric acid generating ammonium salt. The ammonium salt may be of ammonium chloride, ammonium bifluoride, ammonium fluoroborate, ammonium tetrafluoroborate or a mixture thereof. Hydrochloric acid, hydrofluoric acid, or fluoroboric acid is released in the formation from the reaction between the ammonium salt and breaker. Carbonate materials are dissolved in the released acid.

In another embodiment, a method of stimulating a carbonate formation with a self-diverting agent is provided. In this method, an aqueous fluid is introduced into a formation with a gelling agent. The gelling agent is typically a polymer. The aqueous fluid contains a breaker and an ammonium salt and a hydrochloric acid, hydrofluoric acid, or fluoroboric acid generating ammonium salt. The ammonium salt may be ammonium chloride, ammonium bifluoride, ammonium fluoroborate, ammonium tetrafluoroborate or a mixture thereof. Upon its release, hydrochloric acid, hydrofluoric acid, or fluoroboric acid reacts with the carbonate rock. Upon spending of the released acid on the carbonate formation, the fluid becomes more viscous. The gelled fluid then may divert a portion of the acid (and subsequent acid stages) from more permeable zones of the formation to less permeable zones.

In yet another embodiment, a method of forming a consolidated particulate mass in a well is provided. In this embodiment, a slurry comprising a curable resin, curing agent, breaker and hydrochloric acid, hydrofluoric acid, or fluoroboric acid generating ammonium salt is pumped into the well. The ammonium salt may be ammonium chloride, ammonium bifluoride, ammonium fluoroborate, ammonium tetrafluoroborate or a mixture thereof. Hydrochloric acid, hydrofluoric acid, or fluoroboric acid is released in the formation from the reaction between the ammonium salt and breaker. The curable resin is hardened onto particulates in the formation; the released acid catalyzing the hardening of the curable resin. A consolidated particulate mass is formed from the coated particulates.

A further embodiment is drawn to a method of treating a well or a subterranean formation penetrated by a well by pumping into the well an aqueous fluid comprising sodium silicate, a breaker and a hydrochloric acid, hydrofluoric acid, or fluoroboric acid generating ammonium salt. The ammonium salt may be ammonium chloride, ammonium bifluoride, ammonium fluoroborate, ammonium tetrafluoroborate or a mixture thereof. Hydrochloric acid, hydrofluoric acid or fluoroboric acid is released in the formation from the reaction between the ammonium salt and breaker. The released acid reacts with silicate ions and forms a non-crystalline ringing silica gel. The silica gel effectively seals reservoir porosity and permeability.

DETAILED DESCRIPTION

Characteristics and advantages of the present disclosure and additional features and benefits will be readily apparent to those skilled in the art upon consideration of the following detailed description of exemplary embodiments of the present disclosure. It should be understood that the description herein, being of exemplary embodiments, is not intended to limit the claims of this patent or any patent or patent application claiming priority hereto. On the contrary, the intention is to cover all modifications, equivalents and alternatives falling within the spirit and scope of the claims.

Reference herein and in the appended claims to components and aspects in a singular tense does not necessarily limit the present disclosure or appended claims to only one such component or aspect, but should be interpreted generally to mean one or more, as may be suitable and desirable in each particular instance The use of the terms "a" and "an" and "the" and similar referents (especially in the context of the following claims) are to be construed to cover both the singular and the plural, unless otherwise indicated herein or clearly contradicted by context. "Optional" or "optionally" means that the subsequently described event or circumstance can or cannot occur.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

As used herein, injecting or injection refers to a process whereby a fluid mixture (e.g., the aqueous fluid) is transferred from a surface of a wellbore to a localized section within the wellbore. As stated herein, injecting may be carried out at a pressure below a fracture pressure of the formation or at a pressure above the fracture pressure of the formation.

All references are incorporated herein by reference.

The aqueous acid fluid disclosed herein provides a means of releasing acid into a well or into the subterranean formation surrounded by a well after the fluid is pumped into the well.

As used herein, "treatment" refers to any treatment for changing a condition of a wellbore or an adjacent subterranean formation. Most desirable forms of treatment for use of the aqueous fluid are specifically discussed herein. Further, as used herein "treatment fluid" refers to a fluid used in a treatment and may include the aqueous fluid.

The subterranean formation may be used in the treatment of any hydrocarbon-bearing reservoir, most notably oil and gas wells and coal bed methane wells.

The aqueous fluid has particular applicability in the treatment of low permeability subterranean formations, carbonate formations (primarily of limestone, dolomite, and chalk), shale, coal, siltstone, and diatomite, as well as sandstone formations. As used herein, the term "sandstone" includes any formation primarily composed of silica, silicate minerals and/or various forms of feldspar and clays.

The aqueous fluid includes a breaker and an ammonium salt. The aqueous acid fluid is typically prepared by mixing the breaker and ammonium salt on site, such as on a platform and then injected downhole. Alternatively, the aqueous acid fluid may be prepared off-site and then transported to the injection site. After being introduced into the well, acid is released downhole or in the formation after the ammonium compound reacts with the breaker.

The ammonium salt of the aqueous fluid is one which generates hydrochloric acid, hydrofluoric acid or fluoroboric acid. The ammonium salt may be ammonium chloride, ammonium bifluoride, ammonium fluoroborate, ammonium tetrafluoroborate as well as a mixture of two or more such salts. Upon interaction of the ammonium salt and breaker downhole or in the formation, hydrochloric acid, hydrofluoric acid or fluoroboric acid is released in the well or in the formation.

In a preferred embodiment, the pH of the aqueous fluid when injected into the well is neutral or about neutral. In an embodiment, the pH of the fluid is between from about 6.4 to about 7.6, more typically from about 6.8 to about 7.2, most typically about 7.0.

Since hydrochloric acid, hydrofluoric acid, and fluoroboric acid are hazardous to handle and highly corrosive to wellbore tubulars and completion equipment, in-situ release of the acid after injection of the aqueous fluid downhole or in the formation ensures safer operations. In addition, it minimizes environmental concerns, health hazards, and hazardous exposure to fuming that typically occurs with handling of acids on the surface or at the platform. Not only does the acid system disclosed herein ensure safer operations on the platform, it does not require acid tanks which facilitate the use of skid mounted on the rig.

Typically, the amount of breaker in the aqueous fluid injected into the well is from about 0.001 to about 30% of the total weight of the aqueous fluid, preferably from about 0.001 to about 20%, most preferably from about 0.003 to about 10% of the total weight of the aqueous fluid.

Typically, the molar ratio of ammonium salt to breaker in the aqueous fluid is from about 1:1 to about 6:1, more typically about 2:1. In an embodiment, the amount of ammonium salt in the aqueous fluid injected into the well is typically from about 0.1 weight percent (based on the total weight of the aqueous fluid) to saturation, more typically from about 0.1 to about 35, most typically from about 1 to about 15, weight percent, based on the total weight of the aqueous fluid.

The water of the aqueous fluid may be any source of water including saltwater, hard water, brackish water, and/or fresh water (including tap water, deionized water or distilled water). In addition, the water may be supplied from a natural or man-made source including produced water (byproduct of the oil industry).

The amount of water in the aqueous fluid injected into the well is that amount sufficient to dissolve the ammonium salt and breaker. In an embodiment, the amount of water in the aqueous fluid injected into the well is less than 80 wt. %, or less than 60 wt. %, or less than 40 weight percent or less than 20 wt. %, or even less than 8 wt. %.

The breaker can be encapsulated or not encapsulated.

In a preferred embodiment, the breaker is a member selected from organic alkanolamines (like diethanolamine, and triethanolamine), acetyltriethyl citrate, tributyl O-acetylcitrate, tri-n-butyl citrate, and triethyl citrate as well as mixtures thereof.

Other suitable breakers include persulfates, peroxydisulfites, peroxycarbonates, inorganic peroxides, organic peroxides, perborates, and alkali bromates. Exemplary breakers include persulfates like ammonium persulfate, sodium persulfate, encapsulated ammonium persulfate, encapsulated sodium persulfate, potassium persulfate, encapsulated potassium persulfate as well as alkaline earth metal persulfates, ammonium peroxydisulfites, percarbonates (such as alkaline earth metal percarbonates), peroxidizers like inorganic peroxides (including encapsulated inorganic peroxides) such as hydrogen peroxide, calcium peroxide, magnesium peroxide, zinc peroxide as well as alkaline earth metal peroxides, organic peroxides (including encapsulated organic peroxides) as well as perborates like sodium perborate (including encapsulated sodium perborate), alkaline earth metal perborates like magnesium perborate, calcium perborate, alkali chlorates, alkali bromites, alkali bromates (like sodium bromate), alkali perchlorates (like sodium perchlorate), alkali iodates (like potassium iodate), alkali periodates (like potassium periodate), alkali chlorites (like sodium chlorite), alkali hypochlorites (like sodium hypochlorite and lithium hypochlorite), alkali hypobromites, alkali earth hypochlorites (like calcium hypochlorite), alkaline earth chlorites, alkaline earth iodates, alkaline earth hypochlorites, alkaline earth hypobromites and mixtures thereof.

Mixtures of any of the aforementioned breakers may also be used. An exemplary mixture may be triethyl citrate and ammonium persulfate.

Further, any of the above breakers referenced above may be combined with an activator to shorten the reaction time between the ammonium salt and breaker and to reduce the needed activation temperature of the reaction. Examples of activators are organic acid esters as well as salts thereof.

Typically, alkali chlorates, alkali bromites, alkali bromates, alkali perchlorates, alkali iodates, alkali periodates, persulfates, alkali chlorites, alkali hypochlorites, alkali hypobromites, peroxides, alkaline earth hypochlorites, alkaline earth chlorites, alkaline earth iodates, alkaline earth hypobromites (as well as mixtures thereof) are used in combination with an organic acid ester.

Exemplary activators include formate esters, such as methyl formate, ethyl formate, propyl formate, butyl formate, chloroethyl formate, ethylene glycol monoformate, ethylene glycol diformate, diethylene glycol diformate, glyceryl monoformate, glyceryl diformate, glyceryl triformate, triethylene glycol diformate and formate esters of pentaerythritol.

Other suitable activators may include acetic acid esters like methyl acetate, ethyl acetate, propyl acetate, butyl acetate, ethylene glycol monobutyl acetate, ethylene glycol diacetate, chloroethyl acetate, ethylene glycol diacetate, ethylene glycol triacetate, lactic acid esters such as methyl lactate, ethyl lactate, propyl lactate, and butyl lactate as well as esters of acetic acid and glycerol such as monoacetin, diacetin, and triacetin. Other activators may include esters or polyesters of glycerol including tripropionin (a triester of propionic acid and glycerol), trilactin. In certain embodiments, the activator may include aliphatic polyesters; poly(lactides); poly(glycolides); poly(epsilon-caprolactones); poly(hydroxy ester ethers); poly(hydroxybutyrates); aliphatic polycarbonates; poly(orthoesters); poly(amino acids); poly(ethylene oxides); and polyphosphazenes; or copolymers thereof. Combinations and derivatives of any of the aforementioned exemplified activators also may be suitable with any of one or more of the breakers referenced above.

The use of an organic acid ester with breaker is especially preferred where the breaker is an alkali bromate (such as sodium bromate), perborate, iodate, persulfates, periodate chlorite, peroxides, hypochlorite, or an alkaline hypochlorite or a mixture containing of such salts.

When present, the molar ratio of breaker to organic acid ester in the aqueous fluid is from about 1:1 to about 20:1, more typically from about 1:1 to about 15:1, most typically about 2:1.

In addition to the ammonium salt and breaker, the aqueous fluid injected into the formation may contain one or more additives commonly used in the treatment of underground reservoirs and subterranean formations. Such additives may include weighting agents, surfactants, emulsifiers, fluorides, fluid loss control additives, gases, surface modifying agents, tackifying agents, corrosion inhibitors, scale inhibitors, catalysts, clay control agents, chelating agents (e.g. GLDA, EDTA, DTPA, HEDTA), biocides, friction reducers, antifoam agents, biocides, friction reducers, antifoam agents, bridging agents, dispersants, flocculants, hydrogen sulfide scavengers, carbon dioxide scavengers, oxygen scavengers, lubricants, viscosifiers, relative permeability modifiers, particulate materials, wetting agents, coating enhancement agents and filter cake removal agents. Further, the aqueous fluid may be injected into the well with a foaming agent (optionally with a gas, such as nitrogen and/or carbon dioxide).

Only after being pumped downhole into the formation and after reaching a targeted location, the acid is released. Unlike regular acid fluids which are injected from the surface and often react too quickly and thereby deplete within short penetration distance in the formation, the in-situ release of the acid from the aqueous fluid of the present disclosure would allow for deep penetration of the live acid in the formation.

The rate of release of the acid may be dependent on many factors including concentrations of the ammonium salt and breaker as well as pH level, temperature and pressure of the formation being treated.

The aqueous fluid may be used at a wide variety of downhole temperatures. For example, the temperature in the well may be less than or equal to 300° F. and in some cases in wells having a bottomhole temperature less than or equal to 125° F. and even less than or equal to 100° F. For instance, when the acid system has an alkali bromate as breaker and combined with an organic acid ester, acid may be released at downhole temperatures less than or equal to 225° F. and even as low as 100° F. In other instances, acid may not be released from the aqueous fluid having the ammonium salt and breaker until a bottomhole temperature is 300° F. or higher, in other instances at a bottomhole temperature in excess of 350° F., in other some at a bottomhole temperature in excess of 500° F., and in other cases in wells at a bottomhole temperature as high as 600° F. As such, the acid system defined herein may be used in very high temperature wells including geothermal wells.

In some instances, the time of reaction between the ammonium salt and breaker, after being pumped into the well, is less than or equal to 60 minutes, in some instances less than or equal to 30 minutes, and in other instances less than or equal to 10 minutes. As such, an advantage offered by the aqueous fluid is a reduction in the amount of the shut-in time of the well. In some instance, shut-in of the well is not even necessary. Such may be the case in those instances where the acid system comprises the ammonium salt in combination with sodium bromate and an organic acid ester.

The methods and compositions described herein can be used for various types of treatments in the wellbore and in subterranean formations.

The aqueous fluid may have particular applicability in acidizing. The term "acidizing" as used herein refers to the process of injecting the aqueous fluid into the subterranean formation through the wellbore. The in-situ released acid dissolves sediments, removes formation residues and/or fragments that inhibit permeability, and/or forms wormholes, in order to enhance or restore the formation productivity.

Acidizing includes matrix acidizing as well as acid fracturing operations. Released acid from the reaction between ammonium salt and breaker dissolves acid-soluble materials. Upon dissolution of these materials, hydrocarbon fluids more easily flow from the formation into the well. In addition, an acid treatment can facilitate the flow of the injected treatment fluids from the well into the formation. Delayed release of acid improves penetration of live acid into the formation and/or into a targeted area.

In the matrix acidizing operation, the aqueous fluid is injected from the well into the formation at a rate and pressure below the pressure sufficient to create a fracture in the formation. The released acid from the aqueous fluid penetrates the formation and reacts with minerals in the formation to increase the formation permeability. In so doing, sediments as well as mud solids are dissolved by the released acid. Such sediments and mud solids, when not treated with the aqueous fluid disclosed herein, may cause formation damage. When injected into carbonate formations, the released acid causes dissolution of the calcareous materials or scales such as inorganic calcium carbonate. Such dissolution, in turn, causes the formation of conductive channels (wormholes) in the formation rock. The controlled release of the acid may be beneficial in creating a more highly conductive branched flow channels (wormholes) and/or more uniform acid treatment intervals than that achieved when the acid is injected directly into the formation from the surface. Productivity of the formation is thereby enhanced by use of the aqueous fluid.

In sandstone formations, the acid primarily removes or dissolves acid soluble materials such as silicic and silicates (especially in the near wellbore region). The dissolution of fine sand (quartz), feldspar, and clay particles frequently found in sandstone formations by the released acid eliminates pore blockages and/or enlarges pore spaces within the formation. Radial penetration and uniform distribution of the acid at the desired zone of treatment in the wellbore, typically a problem in matrix acidizing treatments, is significantly improved by the aqueous fluid since the reaction between the ammonium salt and breaker may be delayed until the treatments in aqueous fluid is placed into the formation. Corrosion of wellbore tubulars and equipment in the well which typically occurs with conventional systems (where acid is injected into the well) does not occur when the aqueous fluid disclosed herein is injected into the well.

In an embodiment of an acid fracturing operation, a pad fluid and/or fracturing fluid may first be pumped into the well at a pressure sufficient to create one or more fractures and/or extend fractures in the formation. The aqueous fluid defined herein may then be pumped into the well.

In another embodiment, the aqueous fluid defined herein may be pumped into the well at a pressure sufficient to create one or more fractures and/or extend fracture(s) in the formation.

The released acid unevenly etches the created fracture face such that when the acid fracturing operation is completed and the fracture closes, highly conductive channels to the well remain in the formation. The controlled release of the acid may also allow for deep penetration of the live acid in the fracture in the acid fracturing operation.

The aqueous fluid may further contain a viscosifying or gelling agent and, optionally, a crosslinking agent. The gelling agent may be included in the aqueous fluid or injected into the formation prior to injection of the aqueous fluid.

Suitable viscosifying agents, especially in linear (non-crosslinked) fluids may include natural polymers like xanthan as well as synthetic polymers.

Suitable hydratable polymers include, but are not limited to, galactomannan gums, glucomannan gums, guars, derived guars, and cellulose derivatives. Specific examples are guar gum, guar gum derivatives, locust bean gum, karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art. The viscosity of the aqueous fluid may be further increased by crosslinking the viscosifying or gelling agent with a crosslinking agent. Exemplary crosslinking agents include organometallic compounds as well as the borate ion.

In such applications, the concentration of the gelling agent in the aqueous fluid may be from about 1 to 100 gpt (gallons per thousand gallons), preferably from about 5 to 50 gpt, most preferably from 10 to 30 gpt.

Further, the viscosifying agent may be a viscoelastic surfactant. As used herein, the term "viscoelastic surfactant" refers to a surfactant that imparts or is capable of imparting viscoelastic behavior to a fluid due, at least in part, to the association of surfactant molecules to form viscosifying micelles. Suitable viscoelastic surfactants may be cationic, anionic, or amphoteric in nature. Exemplary viscoelastic surfactants include methyl ester sulfonates, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

The aqueous fluid containing the viscosifying agent may act as a diverting fluid by selectively blocking certain pores temporarily with the viscous gel and forcing more of the aqueous fluid or other treatment fluids into a different direction. For example, the viscous gel may selectively block higher permeability zones and streaks, thereby forcing more of the aqueous fluid or other treatment fluids into lower permeability sections The acid released from the aqueous fluid may further be used to remove scales in the wellbore or in the subterranean formation. In addition to removing calcium carbonate scales and siliceous deposits, the released acid may be used to remove other calcium scales as well as scales of barium, magnesium, iron and zinc including barium sulfate, magnesium fluoride, calcium sulfate, and calcium carbonate scales as well as inorganic scales, such as zinc sulfide, iron sulfide, etc.

The aqueous fluid of the present disclosure may further prevent and/or inhibit the formation of inorganic scales in a subterranean formation. Furthermore, it may be employed in the remediation of oil, gas, and geothermal wells by preventing and/or inhibiting the formation of unwanted deposits on the surfaces of the wellbore, downhole assembly, sand control screens, production equipment and pipelines. Such unwanted deposits form and/or accumulate in the wellbore, production equipment, recovery equipment and well casing. Such accumulated deposits affect productivity and are typically removed prior to cementing or the introduction of completion fluids into the wellbore. When used as a remediation treatment fluid, the aqueous fluid removes undesired deposits prior to the introduction of stimulation fluids or to restore well productivity from the undesired deposits. In a preferred embodiment, the aqueous fluid may be used to remove siliceous or calcareous deposits inside well tubulars. The well treatment composition may also be used to treat pipelines from undesired deposits.

In hydraulic fracturing applications, the aqueous fluid may further be injected into the well before a pad fluid as a "spearhead" stage to reduce the formation breakdown pressure. A pad fluid may be then injected to initiate or create a fracture. Once the fracture is initiated, subsequent stages of fracturing fluid containing a viscosifying agent may then be pumped into the created fracture.

The aqueous fluid may further be used to consolidate loose or poorly consolidated particulates in a well or formation. Hydrocarbon wells are often located in subterranean zones that contain unconsolidated particulates that can migrate out of the well along with hydrocarbon, water and other fluids produced by the well. The presence of the particulates, such as sand, in the produced fluids is problematic since it can abrade pumping and other producing equipment and reduce the fluid production capabilities of the producing zones. Unconsolidated subterranean zones can include those which contain loose particulates that are readily entrained by produced fluids and those wherein the particulates making up the zone are held together with insufficient bond strength to withstand the forces produced by the production of fluids through the zones.

The aqueous fluid may be used in conjunction with consolidation treatments to prevent flowback of unconsolidated particulates from a well by consolidated particulates downhole as well as gravel packs used in sand control operations. In particular, certain resin systems used to consolidate sands and/or loose particulates are often acid activated. In accordance with the present disclosure, a curable resin may be introduced into a portion of a subterranean formation or wellbore where sands or loose particulates reside. The aqueous fluid may be injected as a part of the resin consolidation treatment composition or injected separately. The released acid from the aqueous fluid may then catalyze the curing of the resin. After introducing the treatment composition into the formation or wellbore, the released acid catalyzes curing of the resin to occur at a selected time and/or target interval. The amount of curable resin may be designed to be sufficient to immobilize unconsolidated particulates within the desired treatment radial penetration around the wellbore. The amount of ammonium salt and breaker is determined to release enough acid to cure the resin volume.

Suitable curable resins which may be catalyzed by the released acid include furan resins, furfuryl alcohol-based resins and its derivatives such as those disclosed in U.S. Pat. Nos. 3,409,079 and 5,178,218; butyl lactate resins, phosphate ester resins, cyclohexane dimethanol diglycidyl ether resins and derivatives thereof as well as combinations of the same.

The aqueous fluid may further be used in conjunction with a silicate to form a silica gel plug. The silicate is soluble in water and stable at neutral pH. Typically, the silicate is sodium silicate, though other silicates such as potassium silicate as well as mixtures of sodium silicate and potassium silicate may be used. While the silicate may be a component of the aqueous fluid, the aqueous fluid may further be combined with the liquid silicate, such as on-the-fly. In an embodiment, the amount of liquid silicate may be from 5 to 60%, preferably from 5 to 30%, most preferably from 10 to 20% of the total volume of the aqueous fluid.

Upon its release, the acid hardens or enables the soluble sodium silicate to set as a plurality of silicate particles to create the amorphous silica gel, a non-crystalline ringing gel. This typically proceeds by the released acid reacting with silicate ions to form silicic acid. Under formation temperature, the silicic acids decompose into hydrated silicon dioxide gel to form the silica gel.

The silica gel plug is effectively useful in water shut-off applications. The gel plug that forms from the setting of the soluble sodium silicate causes reduction in permeability of the formation, which stops or reduces the flow of aqueous liquids through the formation. It effectively reduces the flow of unwanted water into the well and seals the formation porosity and permeability.

After the formation is sealed with the gel plug, other treatment operations, such as the aforementioned acidizing operation, may be performed, when desired.

EXAMPLES

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

A neutral mixture prepared at the surface on site and at room temperature may be used in the release of acid. When injected into a carbonate formation, the released acid can dissolve carbonate materials and improve permeability and/or remove damage. When injected into a sandstone formation, the released acid can dissolve siliceous material to improve permeability and/or remove damage.

A mixture of acid generating ammonium salt and breaker was prepared in 100 ml. of water. The pH of the mixture was measured. The mixture was then transferred to a high-pressure high temperature (HPHT) sealed cell. The cell was placed in an oven at an elevated temperature. The cell was then cooled to room temperature and the acid concentration in the aqueous solution was measured. The concentration of the released acid from the mixture was measured. The results are set forth in Table I below.

TABLE I

| Ex. No. | Formation | Ammonium Compound | Amt. Ammonium Compound, g | Breaker | Amt. Breaker, g | Mixture pH | Oven Temp, °F. | Time, min. | Amount released HCl, % wt. | Amount released HF, % wt. | Amount released fluoroboric acid, % wt. |
|---|---|---|---|---|---|---|---|---|---|---|---|
| 1 | Carbonate | NH4Cl | 3 | TBAC | 3 | 6.8 | 150 | 30 | 2.5 | | |
| 2 | Sandstone | HBF4 | 3 | ATC | 3 | 6.8 | 400 | 60 | | | 1.5 |
| 3 | Sandstone | NH4HF2 | 1.5 | ATC | 1.5 | 6.8 | 200 | 30 | | 1.5 | |
| 4 | Carbonate | NH4Cl | 8 | NaBrO3 | 10 | 7.0 | 120 | 60 | 0 | | |
| 5 | Carbonate | NH4Cl | 8 | SB/AAE | 10/0.5 | 6.9 | 120 | 10 | 5 | | |
| 6 | Sandstone | NH4HF2 | 1.5 | SB/AAE | 2.1/0.5 | 6.9 | 150 | 30 | | 1.5 | |
| 7 | Sandstone | NH4HF2 | 1.5 | NaBrO3 | 2.1 | 6.8 | 350 | 30 | | 1.5 | |
| Comp Ex. 8 | Sandstone | NH4F | 1.0 | NaBrO3 | 2.1 | 6.9 | 350 | 720 | | 1.5 | |

TBAC, tributyl-O-acetylcitrate
ATC, acetyltriethyl citrate
SB/AAE, mixture of sodium bromate/acetic acid ester Embodiment 1. A method of treating a well or a subterranean formation penetrated by a well comprising:
(a) pumping into the well an aqueous fluid comprising (i) a breaker and (ii) a hydrochloric acid, hydrofluoric acid, or fluoroboric acid generating ammonium salt selected from the group consisting of ammonium chloride, ammonium bifluoride, ammonium fluoroborate, ammonium tetrafluoroborate and mixtures thereof; and
(b) releasing hydrochloric acid, hydrofluoric acid or fluoroboric acid in the formation from the reaction between the ammonium salt and breaker.

Embodiment 2. The method of Embodiment 1, wherein the subterranean formation is subjected to matrix acidizing and aqueous fluid is pumped into the well at a pressure less than the pressure required to create or enhance a fracture in the subterranean formation and further wherein reaction of the released hydrochloric acid, hydrofluoric acid or fluoroboric acid with minerals in the formation forms conductive channels or wormholes within the formation.

Embodiment 3. The method of Embodiment 1, wherein the subterranean formation is subjected to acid fracturing and the hydrochloric acid, hydrofluoric acid or fluoroboric acid is released and etches the fracture face to form a conductive channel.

Embodiment 4. The method of Embodiment 1, further comprising dissolving acid-soluble siliceous material in the sandstone formation with the released acid.

Embodiment 5. The method of Embodiment 1, further comprising dissolving carbonate materials in the subterranean formation with the released acid.

Embodiment 6. The method of Embodiment 1, further comprising dissolving scale deposits in the subterranean formation with the released acid.

Embodiment 7. The method of Embodiment 1, wherein the released acid inhibits or controls scale deposition onto or within the subterranean formation.

Embodiment 8. The method of Embodiment 1, wherein the aqueous fluid comprising the hydrochloric acid, hydrofluoric acid, or fluoroboric acid generating ammonium salt and breaker is a fracturing fluid and is pumped into the well at a pressure sufficient to create or enlarge a fracture in the subterranean formation.

Embodiment 9. The method of Embodiment 1, wherein the aqueous fluid comprising the hydrochloric acid, hydrofluoric acid, or fluoroboric acid generating ammonium salt and breaker is a pad fluid or is pumped into the well before or after pumping of a pad fluid.

Embodiment 10. The method of Embodiment 1, wherein the aqueous fluid comprising the hydrochloric acid, hydrofluoric acid or fluoroboric acid generating ammonium salt and breaker is pumped into the well and the released acid catalyzes or activates curing of a resin onto unconsolidated particulates in the formation to form consolidated particulates.

Embodiment 11. The method of Embodiment 10, wherein the consolidated particulates are formed during a sand control operation.

Embodiment 12. The method of Embodiment 10, wherein the consolidated particulates inhibit or prevent flowback of proppant from the well Embodiment 13. The method of Embodiment 1, wherein the released acid reacts with silicate ions and forms a non-crystalline ringing silica gel; the silica gel seals reservoir porosity and permeability.

Embodiment 14. A method of acidizing a subterranean formation penetrated by a well, the method comprising:
  (a) introducing into the well an aqueous fluid comprising (i) a breaker and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
  (b) releasing hydrochloric acid, hydrofluoric acid or fluoroboric acid in the formation from the reaction between the ammonium salt and breaker; and
  (c) dissolving acid soluble materials in the subterranean formation with the released acid, thereby improving permeability of the subterranean formation.

Embodiment 15. The method of Embodiment 14, wherein the released acid etches around a particulate to form a conductive channel.

Embodiment 16. A method for dissolving acid-soluble siliceous material in a formation penetrated by a well which comprises:
  (a) introducing into the well an aqueous fluid comprising (i) a breaker and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
  (b) releasing hydrochloric acid, hydrofluoric acid or fluoroboric acid in the formation from the reaction between the ammonium salt and breaker. and
  (c) dissolving the acid-soluble siliceous material with the released acid.

Embodiment 17. A method for dissolving carbonate materials in a subterranean formation penetrated by a well which comprises:
  (a) introducing into the well an aqueous fluid comprising (i) a breaker and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
  (b) releasing hydrochloric acid, hydrofluoric acid or fluoroboric acid in the formation from the reaction between the ammonium salt and breaker;
  (c) dissolving the carbonate materials with the released acid.

Embodiment 18. The method of Embodiment 17, wherein the carbonate materials are calcite or calcium carbonate scales.

Embodiment 19. A method of stimulating a carbonate formation penetrated by a well comprising:
  (a) introducing into a high permeability zone of the formation an aqueous fluid comprising (i) a gelling agent; (ii) a breaker and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
  (b) releasing hydrochloric acid, hydrofluoric acid or fluoroboric acid into the carbonate formation from the reaction between the breaker and ammonium salt;
  (c) dissolving carbonates by spending the released hydrochloric acid, hydrofluoric acid or fluoroboric acid;
  (d) forming a viscous gel upon spending of the released hydrochloric acid, hydrofluoric acid or fluoroboric acid and blocking a first zone in the formation with the viscous gel; and
  (e) flowing additional acid into a second zone of the formation wherein the permeability of the second zone is less than the permeability of the first zone.

Embodiment 20. The method of Embodiment 19, wherein said additional acid in step (e) is an inorganic acid, organic acid, or chelating agents Embodiment 21. The method of Embodiment 19, wherein said additional acid of step (e) is released in the formation by the reaction of (i) a breaker and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof.

Embodiment 22. A method of forming a consolidated particulate mass in a well comprising:
  (a) pumping into the well (i) a curable resin, (ii) breaker and (iv) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
(b) releasing hydrochloric acid, hydrofluoric acid or fluoroboric acid in the formation from the reaction between the ammonium salt and breaker;
(c) hardening the curable resin onto particulates in the formation wherein the released acid catalyzes the hardening of the curable resin; and
(d) forming the consolidated particulate mass from the coated particulates.

Embodiment 23. The method of Embodiment 22, wherein the curable resin is pumped into the well in a fluid with the breaker and ammonium salt.

Embodiment 24. The method of Embodiment 22, wherein the curable resin is pumped into the well after a fluid is pumped into the well containing the breaker and ammonium salt.

Embodiment 25. The method of Embodiment 22, wherein the consolidated particulate mass is formed during a sand control operation.

Embodiment 26. The method of Embodiment 22, consolidated particulate mass prevents or inhibits flowback of proppant from the formation.

Embodiment 27. The method of any of Embodiments 22 to 26, wherein the curable resin is a furfuryl alcohol-based resin.

Embodiment 28. A method of treating a well or a subterranean formation penetrated by a well comprising:
(a) pumping into the well an aqueous fluid comprising (i) sodium silicate, (ii) a breaker, and (iii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof;
(b) releasing hydrochloric acid, hydrofluoric acid or fluoroboric acid in the formation from the reaction between the ammonium salt and breaker;
(c) reacting the released acid with silicate ions from the sodium silicate and forming a non-crystalline silica gel plug; and
(d) reducing the flow of aqueous liquids through the subterranean formation by the silica gel plug.

Embodiment 29. The method of any of Embodiments 1 to 28, wherein the breaker is encapsulated.

Embodiment 30. The method of any of Embodiments 1 to 29, wherein the ammonium salt is encapsulated.

Embodiment 31. The method of any of Embodiments 1 to 30, wherein the breaker is selected from the group consisting of organic alkanolamines, acetyltriethyl citrate, tributyl O-acetylcitrate, tri-n-butyl citrate and triethyl citrate and mixtures thereof.

Embodiment 32. The method of any of Embodiments 1 to 30, wherein the breaker is selected from the group consisting of diethanolamine, triethanolamine, acetyltriethyl citrate, tributyl O-acetylcitrate, tri-n-butyl citrate and triethyl citrate and mixtures thereof.

Embodiment 33. The method of any of Embodiments 1 to 32, wherein the breaker is selected from the group consisting of persulfates, peroxydisulfites, peroxycarbonates, inorganic peroxides, organic peroxides, perborates and alkali bromates.

Embodiment 34. The method of any of Embodiments 1 to 32, wherein the breaker is selected from the group consisting of ammonium persulfate, sodium persulfate, encapsulated ammonium persulfate, sodium persulfate, potassium persulfate, encapsulated potassium persulfate, alkaline earth metal persulfates, ammonium peroxydisulfites, percarbonates, hydrogen peroxide, calcium peroxide, magnesium peroxide, zinc peroxide, alkaline earth metal peroxides, sodium perborate, alkaline earth meta perborates, sodium bromate, sodium perchlorate, potassium iodate, potassium periodate, sodium chlorite, sodium hypochlorite, lithium hypochlorite and calcium hypochlorite and mixtures thereof.

Embodiment 35. The method of any of Embodiments 1 to 34, wherein the aqueous fluid further comprises an activator selected from the group consisting of formate acid esters, citric acid esters, acetic acid esters, lactic acid ester, esters of acetic acid and glycerol, aliphatic polyesters; poly(lactides); poly(glycolides); poly(epsilon.-caprolactones); poly(hydroxy ester ethers); poly(hydroxybutyrates); aliphatic polycarbonates; poly(orthoesters); poly(amino acids); poly(ethylene oxides); and polyphosphazenes and mixtures thereof.

Embodiment 36. The method of any of Embodiments 1 to 34, wherein the aqueous fluid further comprises an activator selected from the group consisting of methyl acetate, ethyl acetate, propyl acetate, butyl acetate, ethylene glycol monobutyl acetate, ethylene glycol diacetate, chloroethyl formate, chloroethyl acetate, polyglycolic acid, ethylene glycol diacetate and ethylene glycol triacetate and mixtures thereof.

Embodiment 37. The method of Embodiment 35 or 36, wherein the breaker is selected from the group consisting of alkali bromates, alkali chlorates, alkali bromites, persulfates, alkali perchlorates, alkali iodates, alkali periodates, alkali chlorites, peroxides, alkali hypochlorites, alkali hypobromites, alkaline earth hypochlorites, alkaline earth chlorites, alkaline earth iodates, alkaline earth hypobromites and mixtures thereof.

Embodiment 38. The method of any of Embodiments 1 to 37, wherein the temperature in the well is less than or equal to 125° F.

Embodiment 39. The method of any of Embodiments 1 to 37, wherein the temperature in the well is less than or equal to 225° F.

Embodiment 40. The method of any of Embodiments 1 to 37, wherein the temperature in the well is in excess of 350° F.

Embodiment 41. The method of any of Embodiments 1 to 37, wherein the released acid is produced in a well having a temperature as high as 600° F.

Embodiment 42. The method of any of Embodiments 1 to 41, wherein the pH of the treatment fluid is neutral.

Embodiment 43. The method of any of Embodiments 1 to 42, wherein the time of reaction between the hydrochloric acid, hydrofluoric acid or fluoroboric acid generating ammonium salt and breaker after being pumped into the well is less than or equal to 30 minutes.

Embodiment 44. The method of any of Embodiments 1 to 42, wherein the time of reaction between the hydrochloric acid, hydrofluoric acid or fluoroboric acid generating ammonium salt and breaker after being pumped into the well is less than or equal to 10 minutes.

Embodiment 45. The method of any of Embodiments 1 to 44, wherein the aqueous fluid comprising the hydrochloric acid, hydrofluoric acid or fluoroboric acid generating ammonium salt and breaker further comprises a gelling agent.

Embodiment 46. The method of any of Embodiments 1 to 45, wherein the well is a geothermal well.

Embodiment 47. The method of any of Embodiments 1 to 45, wherein the hydrocarbon-bearing formation is coal, shale, limestone, dolomite, siltstone or diatomite.

Embodiment 48. The method of any of Embodiments 1 to 45, wherein the subterranean formation is sandstone.

Embodiment 49. The method of any of Embodiments 1 to 45, wherein the subterranean formation is a carbonate formation.

Embodiment 50. The method of any of Embodiments 1 to 45, wherein the well is a coal bed methane well.

Embodiment 51. The method of any of Embodiments 1 to 50, wherein the aqueous fluid comprising the breaker and hydrochloric acid, hydrofluoric acid or fluoroboric acid generating ammonium salt further comprises at least one member selected from the group consisting of weighting agents, surfactants, emulsifiers, fluorides, fluid loss control additives, gases, surface modifying agents, tackifying agents, foaming agents, corrosion inhibitors, scale inhibitors, catalysts, clay control agents, chelating agents, (e.g. GLDA, EDTA, DTPA, HEDTA), biocides, friction reducers, antifoam agents, bridging agents, dispersants, flocculants, hydrogen sulfide scavengers, carbon dioxide scavengers, oxygen scavengers, lubricants, viscosifiers, relative permeability modifiers, particulate materials, wetting agents, coating enhancement agents and filter cake removal agents.

Embodiment 52. The method of any of Embodiments 1 to 51, wherein the aqueous fluid comprising the breaker and hydrochloric acid, hydrofluoric acid or fluoroboric acid generating ammonium salt further comprises a proppant.

What is claimed is:

1. A method of treating a well or a subterranean formation penetrated by a well comprising:
    (a) pumping into the well an aqueous fluid comprising (i) a breaker selected from the group consisting of organic alkanolamines, acetyltriethyl citrate, tributyl O-acetylcitrate, tri-n-butyl citrate, triethyl citrate, persulfates, peroxydisulfites, peroxycarbonates, peroxides, perborates, bromates, percarbonates, chlorates, bromites, perchlorates, iodates, periodates, chlorites, hypochlorites hypobromites and mixtures thereof and (ii) a hydrochloric acid, hydrofluoric acid or fluoroboric acid generating ammonium salt selected from the group consisting of ammonium chloride, ammonium bifluoride, ammonium fluoroborate, ammonium tetrafluoroborate and mixtures thereof; and (iii) an activator selected from the group consisting of formate acid esters, citric acid esters, acetic acid esters, lactic acid ester, esters of acetic acid and glycerol, aliphatic polyesters; poly(lactides); poly(glycolides); poly(epsilon-caprolactones); poly(hydroxyester ethers); poly(hydroxybutyrates); aliphatic polycarbonates; poly(orthoesters); poly(amino acids); poly(ethylene oxides); and polyphosphazenes and mixtures thereof; and
    (b) releasing hydrochloric acid, hydrofluoric acid or fluoroboric acid in the well or formation from a reaction between the ammonium salt, the breaker and the activator, wherein the temperature in the well is less than or equal to 125° F.

2. The method of claim 1 wherein at least one of the following conditions prevail:
    (a) the subterranean formation is subjected to matrix acidizing and aqueous fluid is pumped into the well at a pressure less than the pressure required to create or enhance a fracture in the subterranean formation and further wherein reaction of the released hydrochloric acid, hydrofluoric acid or fluoroboric acid with minerals in the formation forms conductive channels or wormholes within the formation;
    (b) the subterranean formation is subjected to acid fracturing and the hydrochloric acid, hydrofluoric acid or fluoroboric acid is released and etches the fracture face to form a conductive channel;
    (c) the aqueous fluid is pumped into the well at a pressure sufficient to create or enhance a fracture in the subterranean formation and further wherein the released hydrochloric acid, hydrofluoric acid or fluoroboric acid etches grooves along a fracture face to form a conductive channel;
    (d) the formation is a sandstone formation and acid-soluble siliceous material in the sandstone formation are dissolved with the released acid;
    (e) the formation is a carbonate formation and carbonate materials are dissolved in the carbonate formation with the released acid;
    (f) scale deposits are dissolved in the subterranean formation with the released acid;
    (g) scale deposition onto or within the subterranean formation is inhibited or controlled by the released acid;
    (h) consolidated particulates are formed in the formation by hardening a curable resin onto unconsolidated particulates in the presence of the released acid;
    (i) the aqueous fluid further comprises sodium silicate and the released hydrochloric acid, hydrofluoric acid or fluoroboric acid reacts with silicate ions and forms a silica gel plug;
    (j) the aqueous fluid is a pad fluid;
    (k) the aqueous fluid is pumped into the well before a pad fluid;
    (l) the aqueous fluid is pumped into the well after a pad fluid;
    (m) the aqueous fluid further comprises a gelling agent; or
    (n) flowback of proppant from the well is inhibited or prevented by the released acid.

3. The method of claim 2, wherein the subterranean formation is subjected to matrix acidizing and aqueous fluid is pumped into the well at a pressure less than the pressure required to create or enhance a fracture in the subterranean formation and further wherein reaction of the released hydrochloric acid, hydrofluoric acid or fluoroboric acid with minerals in the formation forms conductive channels or wormholes within the formation.

4. The method of claim 2, wherein the subterranean formation is subjected to acid fracturing and the hydrochloric acid, hydrofluoric acid or fluoroboric acid is released and etches the fracture face to form a conductive channel.

5. The method of claim 2, wherein the aqueous fluid is pumped into the well at a pressure sufficient to create or enhance a fracture in the subterranean formation and further wherein the released hydrochloric acid, hydrofluoric acid or fluoroboric acid etches grooves along a fracture face to form a conductive channel.

6. The method of claim 2, wherein scale deposits are dissolved in the subterranean formation with the released acid.

7. The method of claim 2, wherein scale deposition onto or within the subterranean formation is inhibited or controlled by the released acid.

8. The method of claim 2, wherein consolidated particulates are formed in the formation by hardening a curable resin onto unconsolidated particulates in the presence of the released acid.

9. The method of claim 2, wherein the aqueous fluid further comprises sodium silicate and the released hydrochloric acid, hydrofluoric acid or fluoroboric acid reacts with silicate ions and forms a silica gel plug.

10. The method of claim 2, wherein the aqueous fluid further comprises a gelling agent.

11. The method of claim 2, wherein the formation is a sandstone formation and acid-soluble siliceous material in the sandstone formation are dissolved with the released acid.

12. The method of claim 1, wherein the formation is a sandstone formation and further comprising dissolving acid-soluble siliceous material in the sandstone formation with the released acid.

13. The method of claim 1, wherein the formation is a carbonate formation and further comprising dissolving carbonate materials in the subterranean formation with the released acid.

14. The method of claim 1, further comprising dissolving scale deposits in the subterranean formation with the released acid or controlling or inhibiting scale deposition onto or within the subterranean formation with the released acid.

15. The method of claim 1, wherein the aqueous fluid comprising the hydrochloric acid, hydrofluoric acid or fluoroboric acid generating ammonium salt, breaker and activator is pumped into the well and the released acid catalyzes or activates curing of a resin onto unconsolidated particulates in the formation to form consolidated particulates.

16. The method of claim 1, wherein the formation is a carbonate formation and the released acid reacts with the carbonate formation and forms a viscous gel within a high permeability zone of the formation and further wherein the viscous gel blocks further flow of acid into the high permeability zone and directs further acid flow into a lower permeability zone.

17. The method of claim 1, wherein the breaker or the ammonium salt or both the breaker and the ammonium salt are encapsulated.

18. The method of claim 1, wherein the breaker is selected from the group consisting of persulfates, peroxydisulfites, peroxycarbonates, inorganic peroxides, perborates, alkali bromates, percarbonates, sodium perchlorate, potassium iodate, potassium periodate, sodium chlorite, sodium hypochlorite, lithium hypochlorite and calcium hypochlorite and mixtures thereof.

19. The method of claim 1, wherein the activator is selected from the group consisting of methyl lactate, ethyl lactate, propyl lactate, butyl lactate ethylene glycol monoformate, ethylene glycol diformate, diethylene glycol diformate, glyceryl monoformate, glyceryl diformate, glyceryl triformate, triethylene glycol diformate, formate esters of pentaerythritol, tripropionin, trilactin, and esters of acetic acid and glycerol and mixtures thereof.

20. The method of claim 1, wherein the breaker is an alkali bromate, perborate, peroxide, iodate, periodate, chlorite, persulfate, hypochlorite, or an alkaline hypochlorite or a mixture thereof and wherein the aqueous fluid further comprises an organic acid ester.

21. The method of claim 1, wherein the time of reaction between the hydrochloric acid, hydrofluoric acid or fluoroboric acid generating ammonium salt and breaker after being pumped into the well is less than or equal to 10 minutes.

22. The method of claim 1, wherein the molar ratio of ammonium salt to breaker in the aqueous fluid pumped into the well is from about 1:1 to about 6:1.

23. The method of claim 1, wherein the formation is a carbonate formation and further comprising dissolving carbonate materials in the subterranean formation with the released acid.

* * * * *